United States Patent
Takeuchi et al.

(10) Patent No.: US 10,837,417 B2
(45) Date of Patent: Nov. 17, 2020

(54) ENGINE STARTER APPARATUS

(71) Applicant: DENSO CORPORATION, Kariya (JP)

(72) Inventors: Yoshitomo Takeuchi, Kariya (JP);
Atsuyuki Hiruma, Kariya (JP); Akira Yamada, Kariya (JP); Akihiro Imura, Kariya (JP); Takuro Nakaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 160 days.

(21) Appl. No.: 16/073,257

(22) PCT Filed: Jan. 25, 2017

(86) PCT No.: PCT/JP2017/002434
§ 371 (c)(1),
(2) Date: Jul. 26, 2018

(87) PCT Pub. No.: WO2017/130995
PCT Pub. Date: Aug. 3, 2017

(65) Prior Publication Data
US 2019/0032621 A1  Jan. 31, 2019

(30) Foreign Application Priority Data
Jan. 26, 2016 (JP) ................. 2016-012349

(51) Int. Cl.
*F02N 11/08* (2006.01)
*F02N 15/06* (2006.01)
(Continued)

(52) U.S. Cl.
CPC ........ *F02N 11/0851* (2013.01); *F02D 41/042* (2013.01); *F02N 11/0829* (2013.01);
(Continued)

(58) Field of Classification Search
CPC ............ F02N 11/0829; F02N 11/0851; F02N 11/0859; F02N 15/006; F02N 15/067;
(Continued)

(56) References Cited

U.S. PATENT DOCUMENTS 3,744,467 A * 7/1973 Wagner ............... F02N 11/0803
    123/179.3
7,996,135 B2 * 8/2011 Ishii .................... F02N 11/0855
    123/179.3
(Continued)

OTHER PUBLICATIONS

Mar. 7, 2017 Search Report issued in International Patent Application No. PCT/JP2017/002434.

*Primary Examiner* — Hung Q Nguyen
*Assistant Examiner* — Susan E Scharpf
(74) *Attorney, Agent, or Firm* — Oliff PLC

(57) ABSTRACT

A control apparatus controls the operation of a starter such that, after an idling stop is executed and before a request for starting an engine is subsequently issued, the control apparatus executes a preset which causes a pinion to engage a ring gear. A control apparatus controls the operation of a starter such that, after an idling stop is executed and before a request for starting an engine is subsequently issued, the control apparatus executes a preset which causes a pinion to engage a ring gear. It is determined that the preset condition has been cancelled, and the preset is again executed. In that case, the pinion is already engaged with the ring gear at the time point when a request for starting the engine is issued. In that way it is unnecessary for the control apparatus to push out the pinion after a start request is issued.

5 Claims, 5 Drawing Sheets

(51) Int. Cl.
*F02D 41/04* (2006.01)
*F02N 15/00* (2006.01)
*B60W 10/06* (2006.01)
*B60W 10/08* (2006.01)

(52) U.S. Cl.
CPC ...... *F02N 11/0855* (2013.01); *F02N 11/0859* (2013.01); *F02N 15/006* (2013.01); *F02N 15/067* (2013.01); *B60W 10/06* (2013.01); *B60W 10/08* (2013.01); *F02N 2200/021* (2013.01); *F02N 2200/022* (2013.01); *Y02T 10/48* (2013.01)

(58) Field of Classification Search
CPC ......... F02N 2200/021; F02N 2200/022; F02D 41/042; B60W 10/06; B60W 10/08; Y02T 10/48
USPC ...................................................... 123/179.3
See application file for complete search history.

(56) References Cited

U.S. PATENT DOCUMENTS

| | | | |
|---|---|---|---|
| 8,631,778 B2 * | 1/2014 | Moriya | F02N 11/00 123/179.3 |
| 9,982,647 B2 * | 5/2018 | Imura | F02N 11/0844 |
| 2013/0104830 A1 * | 5/2013 | Moriya | F02N 11/00 123/179.4 |
| 2018/0135583 A1 * | 5/2018 | Mizuno | F02N 11/00 |
| 2019/0145368 A1 * | 5/2019 | Nakaoka | F02N 11/006 |

* cited by examiner

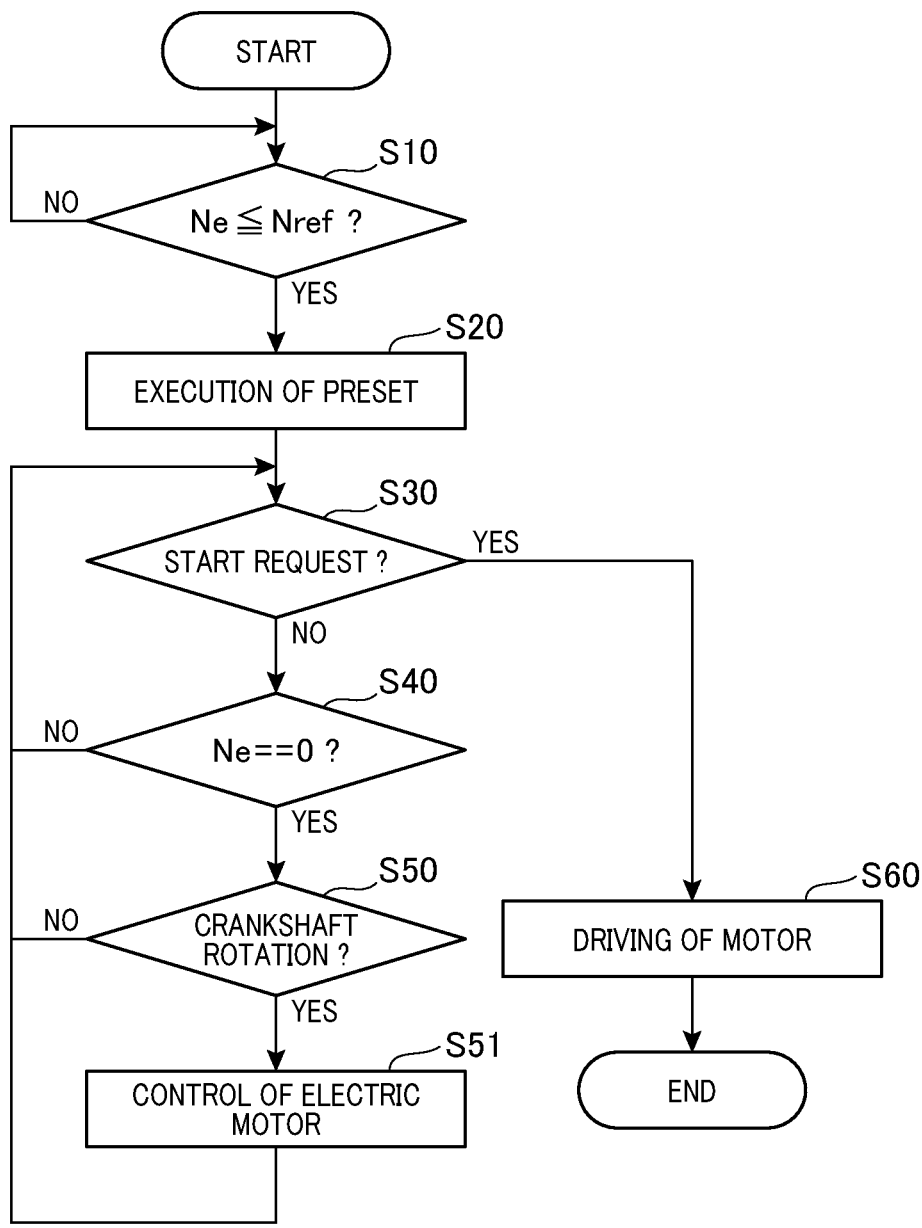

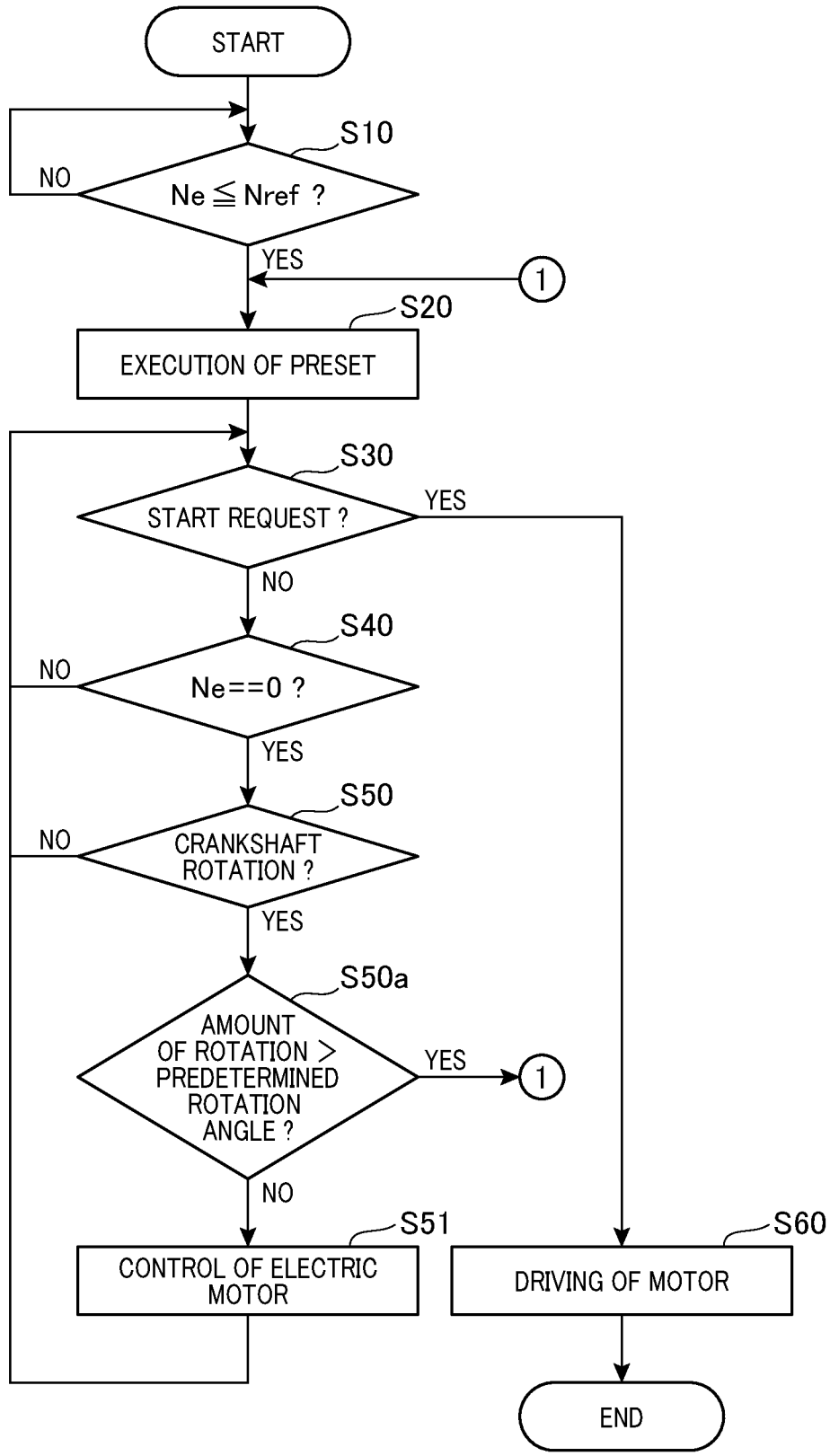

ENGINE STARTER APPARATUS

CROSS-REFERENCE TO RELATED APPLICATION

This application is based on and claims the benefit of priority from earlier Japanese Patent Application No. 2016-012349 filed on Jan. 26, 2016, the disclosures of which are incorporated herein by reference.

TECHNICAL FIELD

The present disclosure relates to engine starter technology that executes a preset operation which engages a pinion of a starter with a ring gear of an engine, while the engine is halted.

BACKGROUND ART

An idling stop is known in the conventional art, whereby when a vehicle is halted temporarily at a road intersection or the like, the engine installed in the vehicle is automatically halted.

With the technology disclosed in Patent Literature 1 (PTL 1), after an idling stop has been executed and before an engine start request has been subsequently issued, the pinion is engaged beforehand with the ring gear at the engine side. In the following description, the operation whereby the pinion is engaged with the ring gear beforehand, prior to an engine start request being issued, will be referred to as the preset. In this preset, when the engine rotation speed has fallen to a sufficiently low value, a current is passed through a solenoid, which has an actuator that pushes out the pinion. When the pinion is pushed out by the actuator, the pinion is moved to the side of the ring gear while being rotated in a reverse direction of rotation by helical splines, and engages the ring gear during inertial rotation. Here, "reverse direction of rotation" signifies a direction of rotation which is opposite to the direction of rotation of the starter motor during engine cranking.

If the engine has halted without reverse rotation of the crankshaft, after the pinion engages the ring gear, then in order to continue the condition in which the pinion engages the ring gear (that condition being referred to in the following as the "preset condition"), passing of current through the solenoid is continued. On the other hand, if the crankshaft rotates in the reverse direction and the engine halts, passing of current through the solenoid is stopped. In that case, the pinion is urged in the reverse direction of rotation by the ring gear. That is to say, if the crankshaft rotates in the reverse direction of rotation and the engine halts, after the pinion engages the ring gear, a force is produced which pushes the tooth surface of the ring gear against the tooth surface of the pinion in the reverse direction of rotation. As a result, even if the current flow through the solenoid is halted, the pinion does not become disengaged from the ring gear, and the preset condition is continued. Due to this, with the above technology, the time that elapses from the issuing of an engine start request until the engine starts can be reduced, and the preset condition is maintained without a current being passed through the solenoid. Power consumption can thereby be reduced, and fuel economy enhanced.

CITATION LIST

Patent Literature

[PTL 1] JP 5316715 B

SUMMARY OF THE INVENTION

Technical Problem

However with the above technology, if the ring gear is rocked after the preset has been executed, due to vibration of the vehicle or the like, while the current flow through the solenoid is halted, the force that urges the pinion in the reverse direction of rotation may become weakened, and as a result the pinion may become separated from the ring gear. If the pinion becomes separated from the ring gear, the pinion will be pulled back by a return spring that is built into the solenoid, and the preset condition will be cancelled. As a result, when an engine start request is issued, it will again become necessary for the pinion to be pushed out for engaging the ring gear. Due to this, with the above technology, the time that elapses until the engine starts will be lengthened.

The present disclosure provides an engine starter apparatus whereby after passing of current through the solenoid is halted, the preset condition can be continued until an engine start request is issued.

Solution of Problem

A first engine starter apparatus, which is one aspect of the technology of the present disclosure, includes a starter which cranks an engine by causing a pinion to engage a ring gear that is coupled to a crankshaft of the engine and by driving the pinion for rotation, a rotation detection section which can directly or indirectly detect rotation of the crankshaft, and a preset execution section which executes a preset operation for engaging the pinion with the ring gear while the engine is halted. The starter includes a pinion pushing mechanism for pushing out the pinion toward the ring gear by use of electromagnetic force that is produced by a solenoid, and a helical spline that rotates the pinion in one direction when the pinion is moved toward the ring gear. After the preset operation has been executed by driving the pinion pushing mechanism by passing a current through the solenoid, if the rotation detection section detects rotation of the crankshaft after passing of current through the solenoid has been halted and before a request for starting the engine has been issued thereafter, the preset execution section again executes the preset operation. Here, "one direction (first direction)" signifies the direction of rotation when engine cranking is being performed, or the opposite direction to the direction of rotation during cranking.

With the first configuration above, when current is passed through the solenoid after the preset condition has been executed, a force acts to urge the pinion back to its original position. That force rotates the pinion in the other direction of rotation, by means of the helical spline. Here, "other direction (second direction)" signifies a direction of rotation that is opposite to a first direction. For example if a direction of rotation that is the reverse of the direction of rotation during engine cranking is referred to as the first direction, then the other direction is the direction of rotation during engine cranking.

As a result, with the first configuration above, the tooth surface of the pinion produces a frictional force which pushes on the tooth surface of the ring gear. Due to this, if the ring gear is in the halted condition, the preset condition is maintained, without the pinion becoming separated from the ring gear.

If the ring gear is rocked, so that the force with which the tooth surface of the pinion pushes on the tooth surface of the ring gear becomes weakened, due to vibration of the vehicle or the like, then the preset condition may be cancelled. As opposed to this, the following occurs with the first engine starter apparatus above. If the rotation detection section of the apparatus detects rotation of the crankshaft during the interval from the time of halting the passing of current through the solenoid until the time at which an engine start request is issued, then passing of current through the solenoid is resumed. In that way, with this engine starter apparatus, the preset condition is continued until an engine start request is issued. As a result, the engine can be rapidly started in response to an engine start request, so that the time until the engine starts becomes shortened.

A second engine starter apparatus, which is one aspect of the technology of the present disclosure, includes a starter which cranks an engine by causing a pinion to engage a ring gear that is coupled to a crankshaft of the engine and by driving the pinion for rotation, a rotation detection section which can directly or indirectly detect rotation of the crankshaft, an electric motor that is coupled to the crankshaft and is capable of driving the crankshaft for rotation, and a preset execution section which executes a preset operation for engaging the pinion with the ring gear while the engine is halted. The starter includes a pinion pushing mechanism for pushing out the pinion toward the ring gear by use of electromagnetic force that is produced by a solenoid, and a helical spline that rotates the pinion in one direction when the pinion is moved toward the ring gear. After the preset operation has been executed by driving the pinion pushing mechanism by passing a current through the solenoid, if the rotation detection section detects rotation of the crankshaft after passing of current through the solenoid has been halted and before a request for starting the engine has been issued thereafter, the preset execution holds the electric motor in a halted condition, to suppress the rotation of the crankshaft. Here, "one direction (first direction)" signifies the direction of rotation when engine cranking is being performed, or the opposite direction to the direction of rotation during cranking.

With the above second configuration, when the rotation detection section detects rotation of the crankshaft, the electric motor is held in the halted state, thereby suppressing rotation of the crankshaft, such as to prevent the tooth surface of the ring gear from separating from the tooth surface of the pinion. As a result, the preset condition is continued, without the pinion becoming separated from the ring gear. Due to this, with the above second engine starter apparatus, as for the above first configuration, the engine can be rapidly started in response to an engine start request, so that the time until the engine starts is shortened.

A third engine starter apparatus, which is one aspect of the technology of the present disclosure, includes a starter which cranks an engine by causing a pinion to engage a ring gear that is coupled to a crankshaft of the engine and by driving the pinion for rotation, a rotation detection section which can directly or indirectly detect rotation of the crankshaft, an electric motor that is coupled to the crankshaft and is capable of driving the crankshaft for rotation, and a preset execution section which executes a preset operation for engaging the pinion with the ring gear while the engine is halted. The starter includes a pinion pushing mechanism for pushing out the pinion toward the ring gear by use of electromagnetic force that is produced by a solenoid, and helical splines that rotate the pinion in one direction when the pinion is moved toward the ring gear. After the preset operation has been executed by driving the pinion pushing mechanism by passing a current through the solenoid, if the rotation detection section detects rotation of the crankshaft after passing of current through the solenoid has been halted and before a request for starting the engine has been issued thereafter, the preset execution section rotates the crankshaft in one direction by only a predetermined amount. Here, "one direction (first direction)" signifies the direction of rotation when engine cranking is being performed, or the opposite direction to the direction of rotation during cranking.

With the above third configuration, when the rotation detection section detects rotation of the crankshaft, the crankshaft is rotated by the electric motor in one direction by only a predetermined amount, such as to prevent the tooth surface of the ring gear from separating from the tooth surface of the pinion. As a result, the preset condition is continued, without the pinion becoming separated from the ring gear. Due to this, with the above third engine starter apparatus as for the above first configuration, the engine can be rapidly started in response to an engine start request, so that the time until the engine starts is shortened.

BRIEF DESCRIPTION OF THE DRAWINGS

FIG. 4 is a flow diagram of a control sequence of a control apparatus in the second and third embodiments.

FIG. 5 is a flow diagram of a control sequence of a control apparatus in a fourth embodiment.

DESCRIPTION OF EMBODIMENTS

Figure 1:
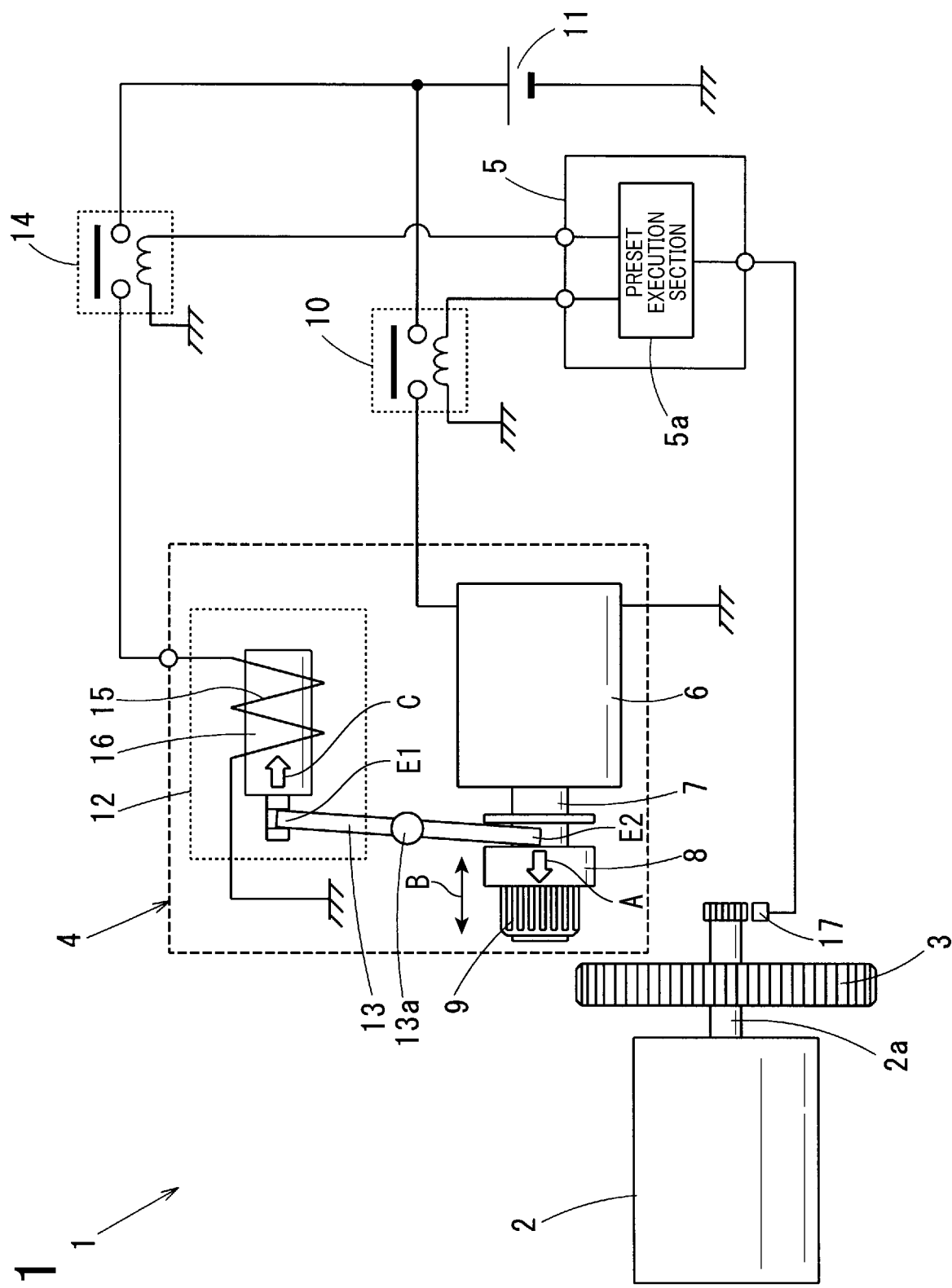
FIG. 1 is an overall configuration diagram of a first embodiment of an engine starter apparatus.

Embodiments of implementing the technology of the present disclosure are described in detail in the following, referring to the drawings.

First Embodiment

A first embodiment of an engine starter apparatus may be used, for example, for engine starting control in a hybrid vehicle having two motive power sources installed, consisting of an engine and a motor (not shown in the drawings).

As shown in FIG. 1, the engine starter apparatus 1 is equipped with a starter 4 and a control apparatus 5. The starter 4 performs cranking of the engine 2 by driving a ring gear 3 for rotation, with the ring gear 3 being coupled to a crankshaft 2a of the engine 2. The control apparatus 5 controls the operation of the starter 4.

The starter 4 is equipped with a motor 6, an output shaft 7, a pinion 9 and a pinion pushing mechanism. The motor 6 produces a rotational force. The output shaft 7 is driven by the motor 6. The pinion 9 is disposed integrally with a clutch 8 that is on the output shaft 7. The pinion pushing mechanism pushes out the pinion 9 in the opposite direction to the motor side (the direction of the arrow A in the drawing).

The motor 6 is for example a DC motor, having a commutator and brushes. When the relay 10 is closed, the motor 6 operates from electric power that is received from the battery 11 (DC power source).

The output shaft 7 rotates to transmit rotational torque via a reduction gear (not shown in the drawings) that is disposed on the same axis as the axis of rotation of the motor 6, with the rotational torque being multiplied by the reduction gear.

The pinion 9 moves on the output shaft 7 in the opposite direction to the motor side, to engage the ring gear 3.

The clutch 8 fits with helical splines that are formed on the outer circumference of the output shaft 7, and transmits the rotation of the output shaft 7 to the pinion 9. On the other hand the clutch 8 blocks the transmission of torque from the output shaft 7 to the pinion 9. In that way, the clutch 8 is a unidirectional clutch. When the pinion 9 is moved in the opposite direction to the motor side, the helical splines cause the pinion 9 to be rotated in the reverse rotation direction. Furthermore when the helical spline returns the pinion 9 in the direction of the motor side, the pinion 9 is caused to be rotated in the forward rotation direction. Here, "forward rotation direction" signifies the direction of rotation when the engine 2 is being cranked. "reverse rotation direction" signifies the direction of rotation which is opposite to the direction when the engine 2 is being cranked.

The pinion pushing mechanism includes an actuator 12 and a shift lever 13. The actuator 12 produces a direct force in an axial direction (the direction indicated by the arrow B in the diagram). The shift lever 13 transmits the drive force of the actuator 12 to the pinion 9.

The actuator 12 includes a solenoid 15, a plunger 16 and a return spring (not shown in the drawings). When the relay 14 is closed, the solenoid 15 becomes supplied with electric power from the battery 11, and produces an electromagnetic force. The plunger 16 is pulled by the solenoid 15 in the direction of the arrow C in the diagram. The return spring (not shown in the drawings) pulls the plunger 16 back.

The shift lever 13 is disposed such as to rock about a fulcrum 13a as center. The shift lever 13 is coupled to the plunger 16 at one end E1 from the fulcrum 13a, and is coupled to the clutch 8 at the other end E2 from the fulcrum 13a.

The control apparatus 5 is a microcomputer that includes a CPU, ROM, RAM, etc. The control apparatus 5 performs various types of control, by executing a control program that is stored, for example, in the ROM. Specifically, the control apparatus 5 controls the operation of the motor 6 and the actuator 12, via the relay 10 and the relay 14. The control apparatus 5 has a preset execution section 5a as one of various control functions. After an idling stop is performed, and before an engine start request is subsequently issued for the engine 2, the preset execution section 5a executes an operation (preset) for engaging the pinion 9 with the ring gear 3. Here, "idling stop" signifies an operation of automatically halting the engine 2, by stopping fuel injection, when the vehicle is temporarily halted by traffic lights at an intersection, or due to traffic congestion.

Figure 2:
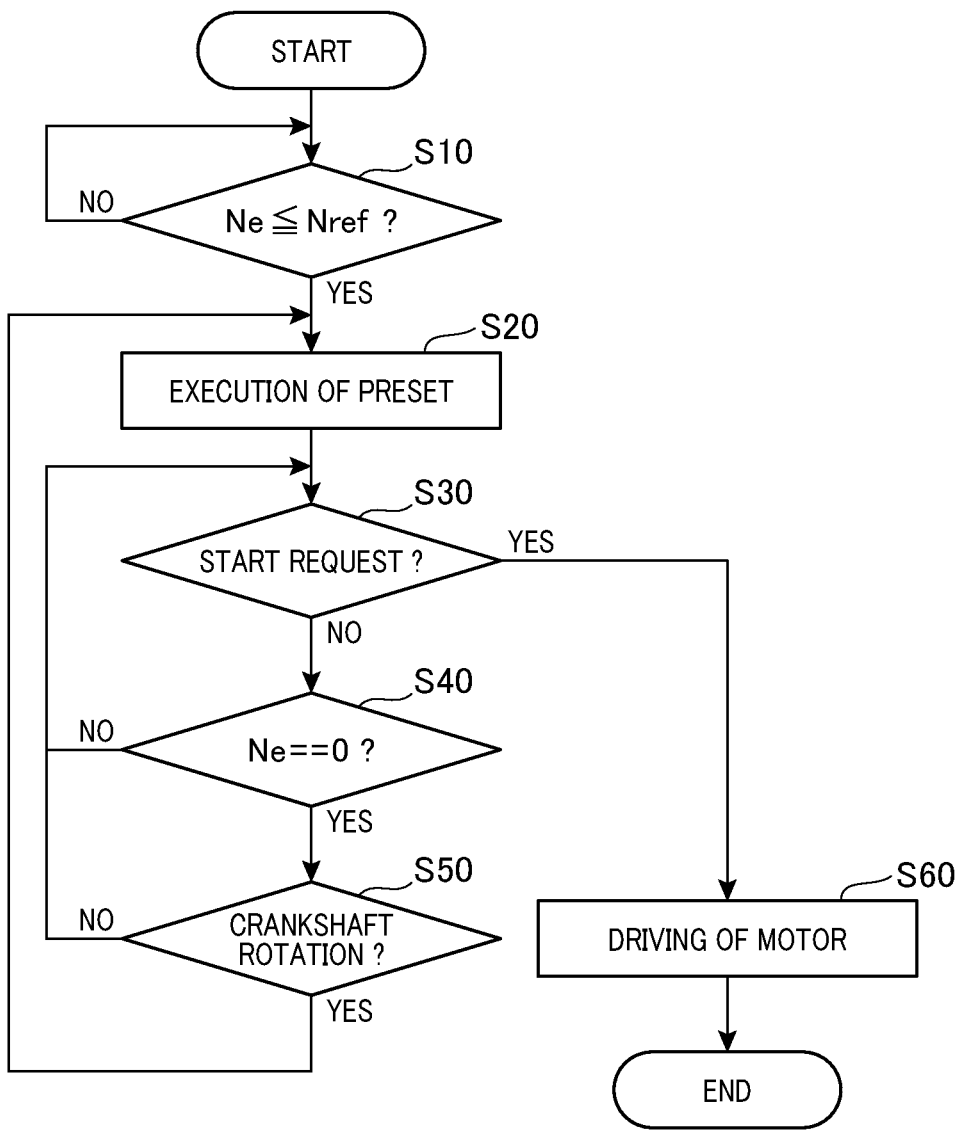
FIG. 2 is a flow diagram of a control sequence of a control apparatus in the first embodiment.

In the following, the control sequence (control processing) executed by the control apparatus 5 of the present embodiment will be described based on FIG. 2. This control processing is performed, following execution of an idling stop, from the time of executing the preset until the engine is started.

The control apparatus 5 compares the engine speed of rotation Ne with a reference value Nref (for example 500 rpm), to determine whether or not Ne is less than or equal to Nref (determines whether or not Ne≤Nref is satisfied) (step S10). If the control apparatus 5 determines that Ne is greater than Nref (S10: NO) then the determination processing of step S10 is repetitively performed until Ne becomes less than or equal to Nref. Thereafter when the control apparatus 5 determines that Ne is less than or equal to Nref (S10: YES), the processing advances to step S20. The determination processing of step S10 is performed for determining whether or not the engine speed Ne has fallen to a sufficiently low value.

The control apparatus 5 then drives the actuator 12, executing the preset (step S20). This preset passes current through the solenoid 15 for driving only the actuator 12, without driving the motor 6. Specifically, as shown in FIG. 1, the plunger 16 of the actuator 12 is pulled in the direction of the arrow C, and acts via the shift lever 13 to push out the pinion 9 in the opposite direction to the motor side (the direction of arrow A). As a result, the preset that is executed in step S20 engages the ring gear 3 with the pinion 9, while the ring gear 3 is in inertial rotation. Following this, the control apparatus 5 halts the passing of current through the solenoid 15, and processing advances to step S30.

The control apparatus 5 determines whether or not a start request has been issued for the engine 2 (step S30). If the control apparatus 5 determines that a start request has not been issued (S30: NO) then processing advances to step S40. On the other hand if the control apparatus 5 determines that a start request has been issued (S30: YES) then processing advances to step S60 in which the motor 6 is driven for starting the engine 2 (step S60).

Next, the control apparatus 5 determines whether or not the engine 2 is halted (determines whether or not Ne=0 is satisfied) (step S40). If the control apparatus 5 determines that the engine 2 is not halted (S40: NO) then processing returns to the determination processing step S30, and the determination processing of step S30 is repetitively executed until the engine 2 becomes halted. It should be noted that, if it is determined at this time that the engine 2 is not halted, then this signifies that the engine 2 is in a condition of inertial rotation. Thereafter, if the control apparatus 5 determines that the engine 2 is halted (S40: YES), processing advances to step S50.

Based on the detection information from the rotation detection section 17 (see FIG. 1), the control apparatus 5 determines (step S50) whether or not the crankshaft 2a has rotated. Here "rotated", for the crankshaft 2a, does not necessarily mean a rotation of over 360°, but signifies behavior whereby the crankshaft 2a is rocked from the stationary state, due to vibration of the vehicle, etc. The rotation detection section 17 consists of an encoder, resolver, crank angle sensor, etc. The rotation detection section 17 detects the rotation position of the crankshaft 2a, and outputs this as detection information. In the case of a hybrid vehicle, an EV mode is provided whereby, instead of starting the engine 2 at the time of vehicle starting, the vehicle is started by using only a motor. During operation in this EV mode, there is a risk that the preset condition may be cancelled, due to rocking of the crankshaft 2a by vibration of the vehicle, etc. In this respect, if the control apparatus 5 determines that there is no rotation of the crankshaft 2a (S50: NO), then processing returns to the determination processing of step S30, and the determination processing of step S50 is repetitively executed until rotation of the crankshaft 2a is detected. If the control apparatus 5 thereafter determines that there is rotation of the crankshaft 2a (S50: YES), then processing returns to step S20, and the preset is again executed. It should be noted that if it is determined, at that time, that there is rotation of the crankshaft 2a, then this signifies that it is determined that the preset condition has been cancelled due to rocking of the crankshaft 2a.

Operation and Effects

With the engine starter apparatus 1 of the present embodiment, if it is detected that there is rotation of the crankshaft 2a, due to vibration of the vehicle or the like, after the preset has been executed and the supplying of current to the solenoid 15 has been halted, then it is determined that the preset condition is cancelled. Based on this determination result, the control apparatus 5 again passes current through the solenoid 15 to execute the preset. It should be noted that this determination result is made irrespective of whether or not the preset condition has actually been cancelled. That is to say, with the engine starter apparatus 1, even in a case in which some slight rotation of the crankshaft 2a has occurred but the preset condition has not actually been released, the preset is again executed if that rotation is detected by the rotation detection section 17. As a result, the engine starter apparatus 1 can continue the preset condition until a start request is issued for the engine 2. Due to this, the engine starter apparatus 1 can speedily start the engine 2 by driving the motor 6, in response to a request for starting the engine 2. Specifically with the engine starter apparatus 1, at the time point when a start request for the engine 2 is issued, the pinion 9 has already engaged the ring gear 3. Hence it is not necessary for the pinion 9 to be pushed out after a start request for the engine 2 is issued, and the time required for starting the engine 2 is shortened accordingly.

In the following, other embodiments of implementing the technology of the present disclosure are described referring to the drawings.

Parts and configurations that are common to the first embodiment above are designated by the same reference symbols as for the first embodiment, and detailed description of these is omitted.

Second Embodiment

With the present embodiment, when the rotation detection section 17 detects rotation of the crankshaft 2a after the preset has been executed and passing of current through the solenoid 15 has been halted, the rotation of the crankshaft 2a is suppressed by means of an electric motor 18 (see FIG. 3) that is coupled to the crankshaft 2a.

Figure 3:
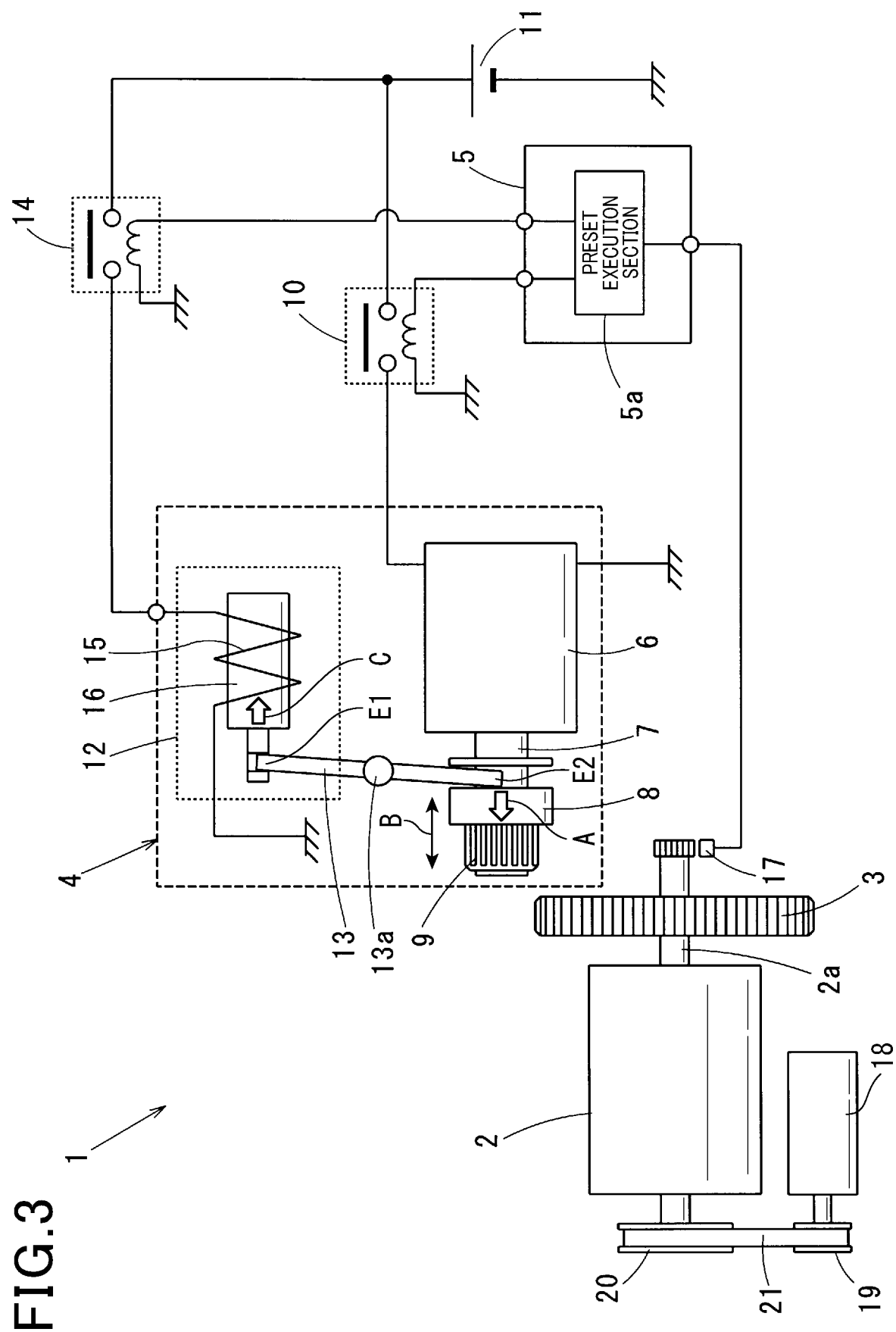
FIG. 3 is an overall configuration diagram of a second and a third embodiment of an engine starter apparatus.

A motor-generator or the like, that is provided for generating electric power, may be used as the electric motor 18. As shown in FIG. 3, the electric motor 18 is coupled to the crankshaft 2a via a belt 21 that bridges an electric motor pulley 19 and a crank pulley 20. The operation of the electric motor 18 is controlled by the control apparatus 5.

In the following, the control sequence (control processing) executed by the control apparatus 5 of the present embodiment will be described based on FIG. 4.

If rotation of the crankshaft 2a is detected by the rotation detection section 17 and it is determined that there is rotation of the crankshaft 2a (step S50: YES), then the control apparatus 5 applies lock control of the electric motor 18 (step S51). Here, "lock control" signifies control for holding the electric motor 18 in a stationary condition, such as not to rotate. The lock control can be effected for example by passing a lock current through the electric motor 18. After the lock control is executed, the control apparatus 5 returns to the control processing of step S30. The respective processing operations of steps S10, S20, S30, S40, S50, and S60 are the same as those of the first embodiment, and for description of the contents of these steps, refer to the description of the first embodiment.

When the passing of current through the solenoid 15 is halted after the preset is executed, the reaction force of the return spring acts to pull the plunger 16 back. The reaction force is changed by the helical spline to a force which rotates the pinion 9 in the forward direction. That is to say, the tooth surface of the pinion 9 is pushed in the forward rotation direction by the tooth surface of the ring gear 3. As a result, the preset condition is continued, without the ring gear 3 becoming separated from the pinion 9.

However in the preset condition, if the pinion 9 rotates due to vibration of the vehicle or the like, the force with which the tooth surface of the pinion pushes on the tooth surface of the ring gear becomes weakened. As a result, the pinion 9 may become separated from the ring gear 3. However with the present embodiment, when rotation of the crankshaft 2a is detected by the rotation detection section 17, lock control of the electric motor 18 is executed, suppressing the rotation of the crankshaft 2a. In that way, with the present embodiment, the tooth surface of the ring gear 3 is prevented from separating from the tooth surface of the pinion 9. As a result, with the present embodiment, the preset condition is continued, without the pinion 9 becoming separated from the ring gear 3. Hence with the engine starter apparatus 1 of the present embodiment, the engine 2 can be rapidly started in response to a start request, and the time required for starting the engine 2 is made shorter.

Third Embodiment

The present embodiment is an example whereby, when the rotation detection section 17 detects rotation of the crankshaft 2a after the preset is executed and passing of current through the solenoid 15 has been halted, the rotation of the crankshaft 2a is suppressed by means of an electric motor 18, which rotates the crankshaft 2a in the reverse direction by only a predetermined amount. The configuration of the engine starter apparatus 1 of the present embodiment is the same as that of the second embodiment, being equipped with the electric motor 18 that is coupled to the crankshaft 2a.

In the following, the control sequence (control processing) executed by the control apparatus 5 of the present embodiment will be described, based on FIG. 4.

If rotation of the crankshaft 2a is detected by the rotation detection section 17, and it is determined that there is rotation of the crankshaft 2a (step S50: YES), then the control apparatus 5 applies rotation control of the electric motor 18 (step S51). Here, "rotation control" signifies control of the angle of rotation of the electric motor 18. The control apparatus 5 controls the rotation angle of the electric motor 18 to effect rotation of the crankshaft 2a in the reverse direction by only a predetermined amount. After the rotation control is executed, the control apparatus 5 returns to the control processing of step S30. The respective processing operations of steps S10, S20, S30, S40, S50, and S60 are the same as those of the first embodiment, and for description of the contents of these steps, refer to the description of the first embodiment.

Here, the "predetermined amount" corresponds to an angle of rotation of the crankshaft 2a. That is to say, the control processing of step S51 of the present embodiment is processing for rotating the crankshaft 2a back, by a predetermined amount of reverse direction rotation. With the present embodiment, when the rotation detection section 17 detects rotation of the crankshaft 2a, the electric motor 18 causes the crankshaft 2a to rotate in the reverse direction by only the predetermined amount. As a result, the tooth surface of the ring gear 3 is prevented from separating from the tooth surface of the pinion 9. Hence with the present embodiment, the preset condition is continued, without the pinion 9 becoming separated from the ring gear 3. The engine starter apparatus 1 of the present embodiment can thus quickly start the engine 2 in response to a start request, thereby reducing the time required for starting the engine 2.

Fourth Embodiment

With the present embodiment, when the rotation detection section 17 detects a large degree of rotation of the crankshaft 2a after the preset has been executed and passing of current through the solenoid 15 has been halted, the preset is again executed. The configuration of the engine starter apparatus 1 of the present embodiment is the same as that of the second embodiment, provided with an electric motor 18 that is coupled to the crankshaft 2a.

In the following, the control sequence (control processing) executed by the control apparatus 5 of the present embodiment will be described, based on FIG. 5.

Based on the detection information from the rotation detection section 17, the control apparatus 5 determines whether or not the amount of rotation of the crankshaft 2a is larger than a predetermined rotation angle (step S50a). Here, "predetermined rotation angle" signifies a rotation angle which would cause the preset condition to be cancelled. If the control apparatus 5 determines that the amount of rotation of the crankshaft 2a is larger than the predetermined rotation angle (S50a: YES), then it is determined that the preset condition has been cancelled, and the preset is again executed (step S20).

If the control apparatus 5 determines that the amount of rotation of the crankshaft 2a is less than or equal to the predetermined rotation angle (S50a: NO), then after executing the control processing of step S51, operation returns to the determination processing of step S30. In step S51, lock control is applied to the electric motor 18, in the same manner as described for the second embodiment. Alternatively, the rotation angle of the electric motor 18 is controlled in the same manner as for the third embodiment, to rotate the crankshaft 2a in the reverse direction of rotation by a predetermined amount.

With the present embodiment, when the crankshaft 2a rotates by a large amount (when it is determined that the preset condition is cancelled), the preset is again executed. As a result, with the engine starter apparatus 1 of the present embodiment, the engine 2 can be rapidly started in response to a request for starting the engine, thereby reducing the time required for starting the engine 2.

Modification Examples

The following modifications could be applied to the above embodiments.

In the processing of step S20 of the first embodiment, it would be equally possible to for the motor 6 to be driven when the preset is executed. The reason for this is that, even in a condition in which the speed of rotation of the crankshaft 2a has fallen to a sufficiently low value (Ne≤Nref), the speed of rotation of the pinion 9 is brought close to the speed of rotation of the ring gear 3, by driving the motor 6. As a result, the preset can be performed more reliably.

Furthermore it would be equally possible to execute the preset, by the processing of step S20, before the speed of rotation of the crankshaft 2a has become sufficiently low (Ne>Nref). In that case, since the preset is performed in a condition in which the speed of rotation of the ring gear 3 is high, the motor 6 should preferably be driven, to reduce the difference between the speeds of rotation of the pinion 9 and the ring gear 3.

Furthermore it would be equally possible to execute the processing of step S20, for driving the actuator 12 and motor 6 and performing the preset, after the engine 2 has completely halted (Ne=0).

The helical splines described for the first embodiment act to rotate the pinion 9 in the reverse direction when the pinion 9 is moved in the opposite direction to the motor side, however that action is not necessarily limited to the reverse direction. That is to say, it would be equally possible to for the helical spline used in the technology of the present disclosure to act such as to rotate the pinion 9 in the forward direction, when the pinion 9 is moved in the opposite direction to the motor side. In that case, with the third embodiment, if rotation of the crankshaft 2a is detected by the rotation detection section 17 after the preset has been executed, the crankshaft 2a would be rotated by electric motor 18 by the predetermined amount in the forward direction.

With the first embodiment, the rotation position of the crankshaft 2a has been described as being detected by the rotation detection section 17, however the technique of the present disclosure is not limited to this. With the configurations of the second to fourth embodiments, which include the electric motor 18, it would be equally possible to for example for the rotation detection section 17 to detect rotation of the electric motor 18, and for the rotation of the crankshaft 2a to be detected indirectly based on that detection information.

The first embodiment has been described for the case in which the motor 6 of the starter 4 is a DC motor, however the technique of the present disclosure is not limited to this. It would be equally possible for example to use an AC motor, whose speed of rotation can be changed by an inverter.

REFERENCE SIGNS LIST

1 . . . Engine starter apparatus
2 . . . Engine
2a . . . Crankshaft
3 . . . Ring gear
4 . . . Starter
5 . . . Control apparatus
5a . . . Preset execution section
9 . . . Pinion
12 . . . Actuator (pinion pushing mechanism)
13 . . . Shift lever (pinion pushing mechanism)
15 . . . Solenoid
17 . . . Rotation detection section
18 . . . Electric motor

The invention claimed is:
1. An engine starter apparatus comprising:
a starter which cranks an engine by causing a pinion to engage a ring gear that is coupled to a crankshaft of the engine, and driving the pinion for rotation;
a sensor configured to directly or indirectly detect rotation of the crankshaft; and
a controller configured to execute a preset operation for engaging the pinion with the ring gear while the engine is halted, wherein the starter comprises:
a pinion pushing mechanism for pushing out the pinion toward the ring gear, by use of electromagnetic force that is produced by a solenoid, and
helical splines that rotate the pinion in one direction when the pinion is moved toward the ring gear, and
wherein, after the preset operation has been executed by driving the pinion pushing mechanism by passing a current through the solenoid, and after the sensor detects rotation of the crankshaft, after passing of current through the solenoid has been halted and before a request for starting the engine has been issued thereafter, the controller again executes the preset operation.

2. An engine starter apparatus comprising:
a starter which cranks an engine by causing a pinion to engage a ring gear that is coupled to a crankshaft of the engine, and driving the pinion for rotation;
a sensor configured to directly or indirectly detect rotation of the crankshaft;
an electric motor that is coupled to the crankshaft and is capable of driving the crankshaft for rotation; and
a controller configured to execute a preset operation for engaging the pinion with the ring gear while the engine is halted,
wherein the starter comprises:
a pinion pushing mechanism for pushing out the pinion toward the ring gear, by use of electromagnetic force that is produced by a solenoid, and
helical splines that rotate the pinion in one direction when the pinion is moved toward the ring gear, and
wherein, when the preset operation has been executed by driving the pinion pushing mechanism by passing a current through the solenoid, and after the sensor detects rotation of the crankshaft, after passing of current through the solenoid has been halted and before a request for starting the engine has been issued thereafter, the controller holds the electric motor in a halted condition, suppressing rotation of the crankshaft.

3. An engine starter apparatus comprising:
a starter which cranks an engine by causing a pinion to engage a ring gear that is coupled to a crankshaft of the engine, and driving the pinion for rotation;
a sensor configured to directly or indirectly detect rotation of the crankshaft;
an electric motor that is coupled to the crankshaft and is capable of driving the crankshaft for rotation; and
a controller configured to execute a preset operation for engaging the pinion with the ring gear while the engine is halted,
wherein the starter comprises:
a pinion pushing mechanism for pushing out the pinion toward the ring gear, by use of electromagnetic force that is produced by a solenoid, and
helical splines that rotate the pinion in one direction when the pinion is moved toward the ring gear, and
wherein, after the preset operation has been executed by driving the pinion pushing mechanism by passing a current through the solenoid, and after the sensor detects rotation of the crankshaft, after passing of current through the solenoid has been halted and before a request for starting the engine has been thereafter issued, the controller rotates the crankshaft in one direction by only a predetermined amount of rotation, by means of the electric motor.

4. An engine starter apparatus according to claim 2, wherein:
after an amount of rotation of the crankshaft detected by the sensor exceeds a predetermined rotation angle, the controller again executes the preset operation.

5. An engine starter apparatus according to claim 1, wherein:
after an idling stop is executed as an operation for automatically halting the engine, when the engine is halted, the controller executes the preset operation after the idling stop has been executed and before a request for starting the engine has been issued thereafter.

* * * * *